United States Patent [19]

Schwarzenbach

[11] 4,403,477
[45] Sep. 13, 1983

[54] AIR STORAGE INSTALLATION BLOWOUT PREVENTION DEVICE

[75] Inventor: Alfred Schwarzenbach, Wettingen, Switzerland

[73] Assignee: BBC Brown, Boveri & Company Limited, Baden, Switzerland

[21] Appl. No.: 184,382

[22] Filed: Sep. 5, 1980

[30] Foreign Application Priority Data

Sep. 7, 1979 [CH] Switzerland ............... 8078/79

[51] Int. Cl.³ ............................. F02C 3/00
[52] U.S. Cl. ........................... 60/659; 60/398; 60/727; 60/682
[58] Field of Search .............. 60/650, 682, 659, 398, 60/727; 405/53

[56] References Cited

U.S. PATENT DOCUMENTS 3,988,897 11/1976 Strub .................... 60/659
3,996,741 12/1976 Herberg ................. 60/398
4,150,547 4/1977 Hobson ................. 60/659

*Primary Examiner*—Allen M. Ostrager
*Attorney, Agent, or Firm*—Burns, Doane, Swecker and Mathis

[57] ABSTRACT

Apparatus for preventing a blowout of a constant pressure air storage installation of a gas turbine power station is disclosed. The apparatus includes a subterranean air storage cavity, a water basin which is substantially at ground level, and a standpipe which connects the water basin to the subterranean cavity. At least an upper portion of the standpipe is arranged obliquely with respect to the horizontal. The apparatus also includes at least one ventilation pipe which is connected to, and in fluid communication with, the upper portion of the standpipe. An upper end of the at least one ventilation pipe is arranged above the water level of the water basin.

4 Claims, 4 Drawing Figures

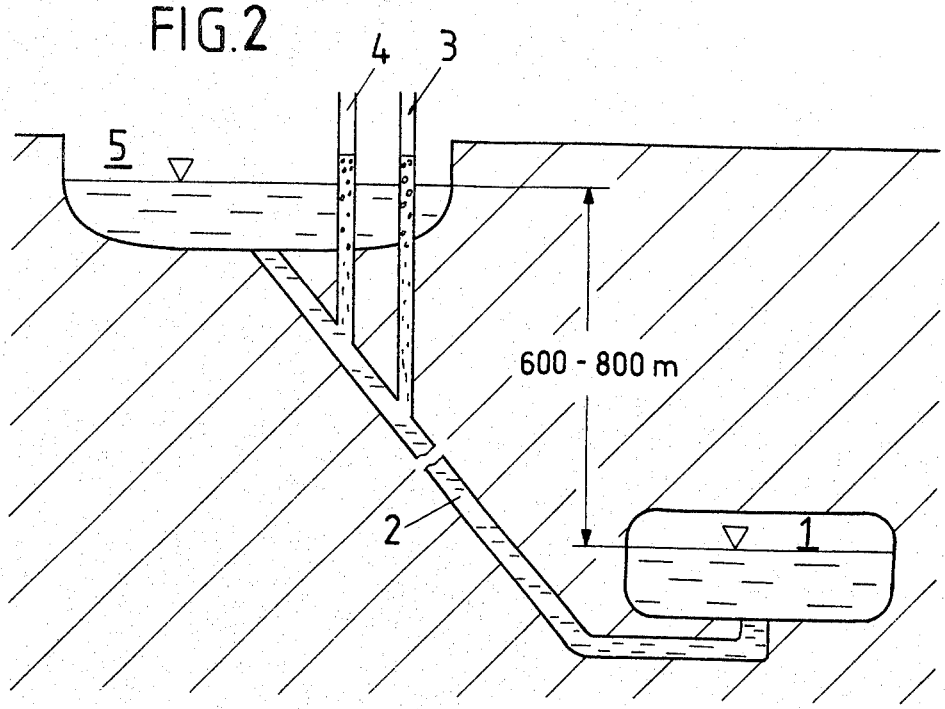
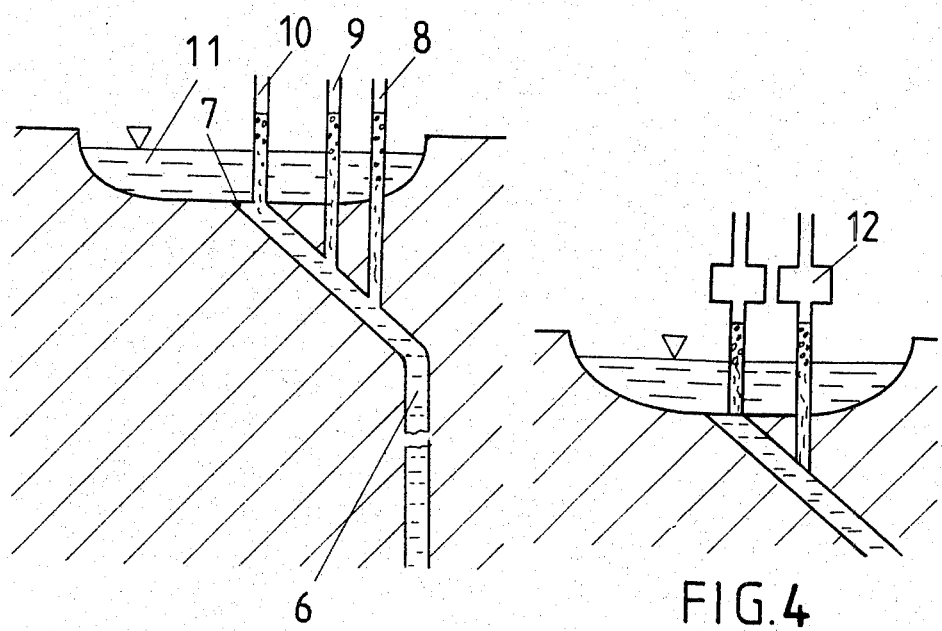

AIR STORAGE INSTALLATION BLOWOUT PREVENTION DEVICE

BACKGROUND AND SUMMARY OF THE PRESENT INVENTION

The invention disclosed herein pertains generally to a constant pressure air storage installation for a gas turbine power station, and more particularly to an apparatus for preventing blowouts of the constant pressure air storage installation.

Constant pressure air storage installations for gas turbine power stations usually include relatively large subterranean cavities beneath the power stations, which cavities are used to store compressed air. The volumes of the air cavities used in constant pressure air storage installations are usually only about one-third the volumes of the cavities used in variable air pressure storage instalations, in which variable air pressure storage installations the pressure is allowed to vary within certain limits. Consequently, the cost of providing a cavity for a constant pressure air storage installation is much lower than the cost of providing a cavity for a variable air pressure storage installation.

To maintain constant air pressure in the air storage cavity of a constant pressure air storage installation, the air storage cavity usually includes a water inlet in fluid communication with a column of water contained within a standpipe. The water which enters the cavity through the water inlet compensates for the volume of air discharged from the cavity during a discharging operation. The height of the water column, which water column is usually in fluid communication with a water basin located at the surface of the ground, corresponds to the static pressure to be maintained in the cavity. In present day installations the air cavity is typically located at a depth of 600–800 m below the ground, which implies that the static pressure at the base of the column of water in the standpipe is in the range 60–80 bar. During the air changing of the cavity, the water in the cavity and in the standpipe is forced upwards under pressure into the basin, while upon discharging air from the cavity water runs from the basin into the cavity to re-establish the required static pressure.

It has been found in the operation of gas turbine air storage installations that during the charging of the cavity the water forced out of the cavity into the standpipe releases dissolved air, thus creating air bubbles whose volumes rapidly increase during their upward ascent within the standpipe. The existence of the air bubbles reduces the density of the column of water in the standpipe, causing a drop in the static pressure at the base of the water column and of the water in the cavity. In an extreme case, the column of water may be blown out of the standpipe by the greater pressure of the charging air in the cavity and the cavity completely emptied of water.

In comparison with the normal rate at which air dissolves in still water, full air saturation of the water in the cavity takes place more rapidly due to the high degree of turbulence produced in the water during the charging and discharging operations, which turbulence enables nearly all of the particles of the water in the cavity to come into contact with the air in the cavity. The amount by weight of air absorbed by the water is proportional to the static pressure which, as noted above, is between 60 and 80 bar. The following examples serve to illustrate the amounts of air dissolved in water at atmospheric pressure and in an air storage cavity at 60 bar pressure:

(1) at an air pressure of 1 bar and a temperature of 10° C., 1 m$^3$ water (=1000 kg) contains 29.2 g air; and (2) at a pressure of 60 bar and a temperature of 10° C., 1 m$^3$ water contains 1.7 kg air, i.e., approximately 58 times the amount by weight of air dissolved in water at 1 bar pressure. At atmospheric pressure, the 1.7 kg of air has a volume of approximately 1.32 m$^3$. A mixture of water and air depressurized from a pressure of 60 bar to atmospheric pressure thus contains more air than water.

When water saturated with air rises upwardly from the air cavity through the water column, the water from the air cavity releases dissolved air, that is, the air comes out of solution and forms bubbles of gradually increasing size because of the decreasing hydrostatic pressure. The average density of the water column therefore becomes constantly smaller and the static pressure of the water at the base of the water column and in the cavity decreases correspondingly. This may lead, if suitable measures are not taken, to a blow-out of the cavity and of the water column.

A known method for preventing blow-outs is to extend the standpipe containing the water column in a U-shaped arc beneath the bottom of the cavity. The deepest penetration of the standpipe into the ground must be at least 0.15 h beneath the prevailing water level in the cavity, where h is the effective pressure height, i.e., the difference between the geodetic height of the upper water level in the water basin and the water level in the cavity. If h=600 m, then this means that the standpipe, which is already 600 m long, will have to be extended downwardly in a U-shaped arc by another 90 m, which represents an unacceptable additional construction cost.

Accordingly, a primary object of the present invention is to provide a relatively simple and inexpensive apparatus for preventing blow-outs in the compressed air storage installations of gas turbine power stations.

Apparatus for preventing a blow-out of a constant pressure air storage installation of a gas turbine power station, according to the present invention, includes a subterranean air storage cavity, a water basin which is substantially at ground level, and a standpipe connecting the water basin to the subterranean cavity. At least an upper portion of the standpipe is arranged obliquely with respect to the horizontal. The present invention also includes at least one ventilation pipe which is connected to, and in fluid communication with, the upper portion of the standpipe. An upper end of the at least one ventilation pipe is arranged above the water level of the water basin.

BRIEF DESCRIPTION OF THE DRAWINGS

Preferred embodiments of the present invention are described with reference to the accompanying drawings wherein like members bear like reference numerals and wherein:

FIG. 2 is a cross-sectional view of a first preferred embodiment of apparatus for preventing a blow-out of the air storage cavity of a constant pressure air storage installation of a gas turbine power station, according to the present invention;

FIG. 3 is a cross-sectional view of a second preferred embodiment of apparatus for preventing a blow-out of an air storage cavity, according to the present invention; and FIG. 4 is a cross-sectional view of a third preferred embodiment of apparatus for preventing a blow-out of an air storage cavity, according to the present invention.

DETAILED DESCRIPTION OF THE PREFERRED EMBODIMENTS

Figure 1:
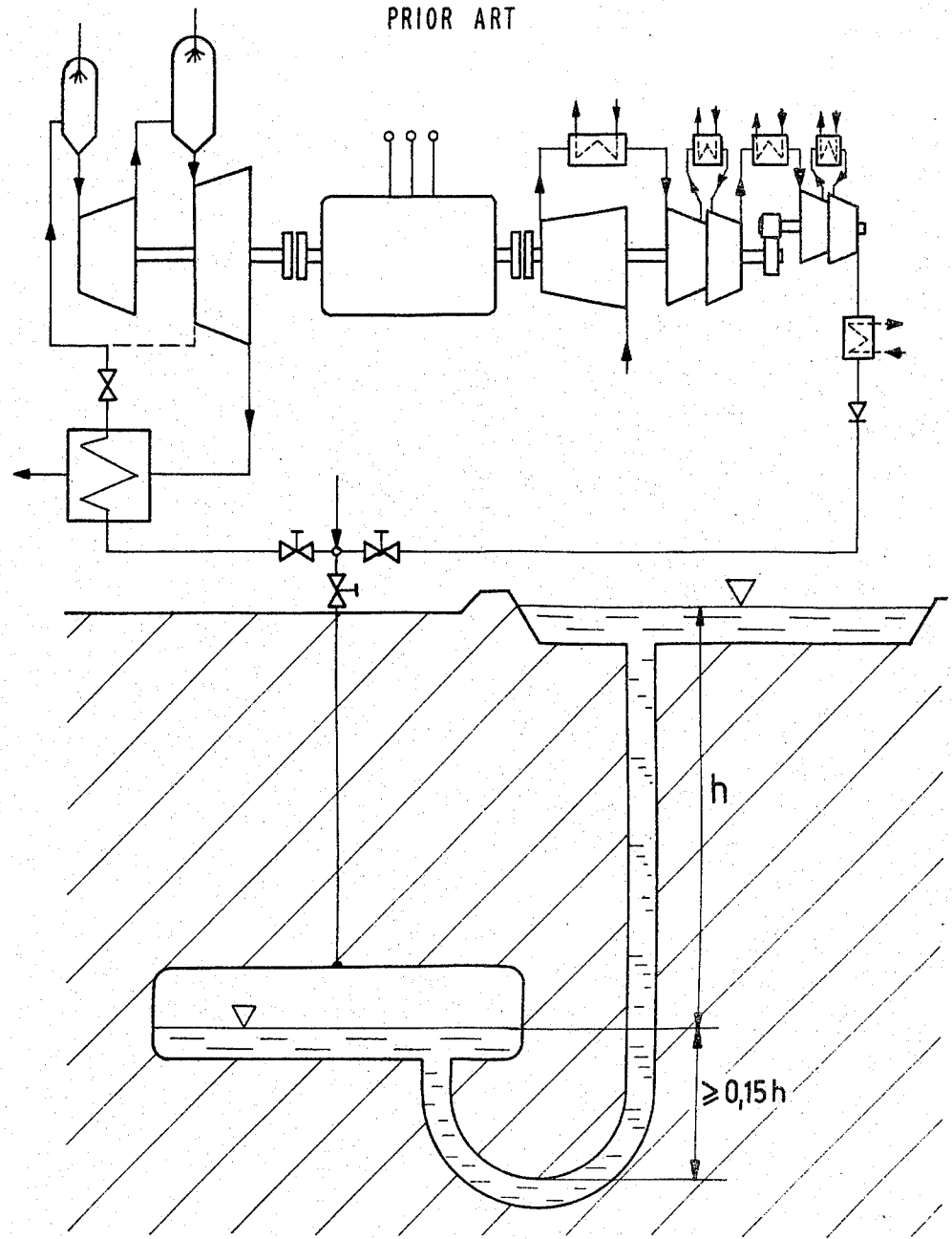
FIG. 1 is a schematic of a present day, state of the art, constant pressure air storage gas turbine power station with a standpipe extending in a U-shaped arc beneath the bottom of the air storage cavity to prevent a blow-out of the contents of the cavity.

With reference to FIG. 1, a state of the art constant pressure air storage installation of a gas turbine power station includes a subterranean air storage cavity arranged beneath the power station, which air cavity receives water through a water inlet from a column of water contained in a subterranean, vertical standpipe. The standpipe is in fluid communication with a water basin at the surface of the ground. The standpipe contains a vertical column of water having a height h between the water levels of the cavity and water basin. In order to prevent a blow-out of the water column and of the water in the cavity as a result of a reduction of the density of the water column due to the existence of the air bubbles described above, the standpipe includes a downwardly directed U-shaped channel which merges into the water inlet at the bottom of the air cavity. As mentioned above, the U-shaped channel necessarily extends downwardly by 0.15 h below the lowest operationally permissible water level of the cavity, thus involving a substantial increase in the capital costs of the installation.

With reference to FIG. 2, a first preferred embodiment of apparatus, according to the present invention, for preventing a blow-out of a constant pressure air storage installation of a gas turbine power station, includes a water filled, oblique standpipe 2 arranged within the ground beneath the power station. A lower end of the oblique standpipe 2 includes a horizontal portion which merges into the water inlet at the bottom of a subterranean air storage cavity 1 arranged beneath the power station. An upper end of the oblique standpipe 2 opens into a water filled basin 5 at the surface of the ground. The first embodiment of the present invention also includes vertically arranged ventilation standpipes 3 and 4 which are connected to, and in fluid communication with, an upper portion of the oblique standpipe 2. The upper ends of the ventilation standpipes 3 and 4 project upwardly through the water basin 5, with the openings of the ventilation standpipes 3 and 4 arranged above the water level of the basin 5.

During the charging of the cavity 1, the water displaced into the standpipe 2 releases increasing amounts of dissolved air which accumulates in the upper portion of the pipe 2 and escapes, along with a portion of the water in the pipe 2, into the ventilation pipes 3,4. The water in the upper part of the oblique standpipe 2 thus contains less air and the average density of the water column in the oblique standpipe is therefore much higher than in a conventional vertical standpipe which does not include ventilation apparatus. Thus, by using an oblique standpipe in fluid communication with vertical ventilation pipes, the present invention prevents blow-outs.

With reference to FIG. 3, a second preferred embodiment of apparatus, according to the present invention, for preventing blow-outs of a constant pressure air storage installation of a gas turbine power station, includes a water filled standpipe 6 which is arranged in the ground beneath the power station. The standpipe 6 includes a first, vertically arranged portion, a lower end of which first portion merges into a water inlet of a subterranean air storage cavity arranged beneath the power station. The standpipe 6 also includes a second, oblique portion, oblique with respect to a horizontal surface, a lower end of which oblique portion is connected to an upper end of the first, vertical portion. An upper end of the oblique portion of the standpipe 6 also includes an opening 7 which opens into a water basin 11. A length of the second, oblique portion of the standpipe 6 may be equal to a quarter of the total length of the standpipe 6, and the oblique portion may be arranged substantially directly beneath the basin 11.

Two vertically arranged ventilation standpipes 8 and 9 are connected to, and in fluid communication with, the upper oblique portion of the standpipe 6. A third vertically arranged ventilation standpipe 10 is also connected to, and in fluid communication with, the upper portion of the standpipe 6, adjacent the opening 7. The upper ends of the ventilation standpipes 8, 9 and 10 project upwardly through the water basin 11, with the openings of the ventilation standpipes arranged above the water level of the basin 11.

In the operation of the second embodiment, air bubbles rising through the water column contained in the standpipe 6 are vented to the atmosphere through the vertical ventilation pipes 8 and 9. Any air bubbles not vented through the ventilation pipes 8 and 9 are vented to the atmosphere through the ventilation pipe 10. Thus, water practically free of air bubbles enters the basin 11 through the remaining cross section of the opening 7. It may be assumed that in this manner, from the lower end of the standpipe 6 where the onset of the precipitation of the first large air bubbles occurs, to the bottom of the water basin 11, the air bubbles are vented to the atmosphere in the upper portion of the standpipe 6, so that the lower portion of the standpipe 6 contains water practically free of air bubbles. Because the static pressure at the base of the standpipe 6, assuming the diameter of the standpipe is large enough to prevent capillary effects, is not affected by the cross section of the water column, it follows that the static pressure is proportional to the height and the density of the water column, which water column is largely free of air bubbles in the lower portion of the standpipe 6. The air bubbles vented to the atmosphere in the upper portion of the standpipe 6 thus do not reduce the density of the water column contained in the standpipe 6. For this reason, the static pressure at the base of the standpipe 6 of the present invention will be practically equal to the static pressure at the base of a water column which contains no air bubbles.

With reference to FIG. 4, a third preferred embodiment of apparatus, according to the present invention, is similar to the second embodiment except that the vertically arranged ventilation standpipes of the third embodiment include quieting chambers 12 arranged near the upper ends of the ventilation standpipes. In the event of a sharp pressure increase, the quieting chambers 12 help prevent a rapidly rising mixture of water and air from shooting through the ventilation standpipes and forming jet sprays. That is, the quieting chambers 12 provide settling chambers wherein the rising mixture of water and air can settle, enabling air bubbles to be vented to the atmosphere with little or no water being spewed into the atmosphere.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. In a constant pressure air storage installation of a gas turbine power station of the type having a compressor and a gas turbine and a subterranean air storage cavity with connecting lines for supplying air from the compressor to the storage cavity and from the storage cavity to the gas turbine, a water basin at a higher level than the cavity, and a standpipe connecting the water basin to the subterranean cavity, the improvement wherein:
   at least an upper portion of said standpipe is inclined with respect to the horizontal; and
   said standpipe includes a ventilation pipe which is connected to, and in fluid communication with, said upper portion of said standpipe to receive a water-air mixture forming during the charging of said air storage cavity, said ventilation pipe extending through the water basin with an upper end of said ventilation pipe extending above the water level of said water basin to permit the venting of air from said water-air mixture thereby preventing a blowout of said air storage cavity.

2. In a constant pressure air storage installation of a gas turbine power station of the type having a compressor and a gas turbine and a subterranean air storage cavity with connecting lines for supplying air from the compressor to the storage cavity and from the storage cavity to the gas turbine, a water basin at a higher level than the cavity, and a standpipe connecting the water basin to the subterranean cavity, the improvement wherein:
   at least an upper portion of said standpipe is inclined with respect to the horizontal and wherein a length of the upper portion of said standpipe is substantially equal to one-quarter of a total length of the standpipe, said upper portion being arranged substantially directly beneath the water basin;
   said standpipe includes a ventilation pipe which is connected to, and in fluid communication with, said upper portion of said standpipe, an upper end of said ventilation pipe extending above the water level of said water basin; and
   said standpipe further includes an additional ventilation pipe which is connected to, and in fluid communication with, said upper portion of said standpipe, an upper end of said additional ventilation pipe being arranged abve the water level of said water basin, said ventilation pipes branching out from said upper portion of said standpipe toward said water basin.

3. In a constant pressure air storage installation of a gas turbine power station of the type having a compressor and a gas turbine and a subterranean air storage cavity with connecting lines for supplying air from the compressor to the storage cavity and from the storage cavity to the gas turbine, a water basin at a higher level than the cavity, and a standpipe connecting the water basin to the subterranean cavity, the improvement wherein:
   at least an upper portion of said standpipe is inclined with respect to the horizontal;
   said standpipe includes a ventilation pipe which is connected to, and in fluid communication with, said upper portion of said standpipe to receive a water-air mixture forming during the charging of said air storage cavity, an upper end of said ventilation pipe extending above the water level of said water basin to permit the venting of air from said water-air mixture thereby preventing a blowout of said air storage cavity; and
   a settling chamber arranged adjacent the upper end of said ventilation pipe for preventing a rapidly rising water-air mixture from forming jet sprays by allowing the water portion of said mixture to settle out while the air portion is vented.

4. In a constant pressure air storage installation of a gas turbine power station of the type having a compressor and a gas turbine and a subterranean air storage cavity with connecting lines for supplying air from the compressor to the storage cavity and from the storage cavity to the gas turbine, a water basin at a higher level than the cavity, and a standpipe connecting the water basin to he subterranean cavity, the improvement wherein:
   at least an upper portion of said standpipe is inclined with respect to the horizontal;
   said standpipe includes a ventilation pipe which is connected to, and in fluid communication with, said upper portion of said standpipe to receive a water-air mixture forming during the charging of said air storage cavity, an upper end of said ventilation pipe extending above the water level of said water basin to permit the venting of air from said water-air mixture thereby preventing a blowout of said air storage cavity;
   an additional ventilation pipe which is connected to, and in fluid communication with, said upper portion of said standpipe, an upper end of said additional ventilation pipe being arranged above the water level of said water basin; and
   said ventilation pipes branching out from said upper portion of said standpipe toward said water basin.

* * * * *